United States Patent [19]
Brady

[11] 3,750,051
[45] July 31, 1973

[54] MULTI-LEVEL MODULATOR FOR COHERENT PHASE-SHIFT KEYED SIGNAL GENERATION

[75] Inventor: Douglas MacPherson Brady, Middletown, N.J.

[73] Assignee: Bell Telephone Laboratories, Incorporated, Murray Hill, N.J.

[22] Filed: Apr. 12, 1972

[21] Appl. No.: 243,319

[52] U.S. Cl. ............ 332/9 R, 178/66 R, 325/38 A, 325/163, 332/11 R, 332/22
[51] Int. Cl. ............................................ H04l 27/20
[58] Field of Search .................. 332/9 R, 9 T, 16 R, 332/16 T, 11 R, 11 D, 22; 325/163, 30, 40, 38 A; 178/66 R, 67, 88

[56] References Cited

UNITED STATES PATENTS

| | | | |
|---|---|---|---|
| 3,699,479 | 10/1972 | Thompson et al. | 332/22 X |
| 3,686,588 | 8/1972 | Jackson et al. | 332/11 R X |
| 3,601,701 | 8/1971 | Salmon | 325/163 X |
| 3,289,082 | 11/1966 | Shumate | 178/66 R X |
| 3,242,262 | 3/1966 | Melas et al. | 325/30 X |

*Primary Examiner*—Alfred L. Brody
*Attorney*—W. L. Keefauver et al.

[57] ABSTRACT

A modulator for developing a frequency modulated coherent phase-shift keyed signal having two or more phase deviations. The modulator comprises a mixer circuit which mixes first and second two-level frequency modulated phase-shift keyed signals to develop the above-indicated multi-level signal.

14 Claims, 4 Drawing Figures

MULTI-LEVEL MODULATOR FOR COHERENT PHASE-SHIFT KEYED SIGNAL GENERATION

BACKGROUND OF THE INVENTION

This invention pertains to digital data transmission and, more particularly, to multi-level modulators for use in such transmission.

In copending application Ser. No. 243,254 filed Apr. 12, 1972 by D. M. Brady there is disclosed a modulator capable of encoding the two information states of a binary signal into two corresponding phase deviations of a frequency modulated coherent phase-shift keyed signal. The aforesaid application points out that when encoding binary data into a frequency modulated phase-shift keyed signal (FM-PSK), it is advantageous that the resultant FM-PSK signal be coherent. The advantages to be gained from generating a coherent two-level (FM-PSK) signal stem primarily from the fact that with such a signal coherent detection techniques can be used as a detecting mechanism. Since coherent detection is impaired less by noise, intersymbol interference and interference from other signals than are other modes of detection, its use results in an overall increase in system efficiency.

In cases where it is desired to encode more than two information states into a FM-PSK signal as, e.g., where it is desired to encode the four information states carried via two synchronized binary signals into four phase deviations of a single FM-PSK signal, the advantage to be gained by developing a signal which is also coherent are similar to those indicated above for the two-level case. Thus, generation of a multi-level frequency modulated coherent phase-shift keyed (FM-CPSK) signal permits coherent detection methods to be used and, as a result, promotes increased system efficiency.

It is therefore a broad object of the present invention to provide a modulator for developing a multi-level FM-CPSK signal.

SUMMARY OF THE INVENTION

In accordance with the principles of the present invention, the above and other objectives are accomplished by a modulator comprising a mixer circuit for mixing first and second two-level FM-CPSK signals having different phase deviations. One of the aforesaid two-level FM-CPSK signals represents an encoded form of a first binary signal and it develops first and second phase deviations corresponding to the two states of the first signal. The other two-level signal corresponds to a second binary signal, which is synchronized to the first signal, and it develops third and fourth phase deviations corresponding to the two states of the second signal. The mixer circuit develops an output signal which is at the sum frequency and, thus, the sum phase of the first and second signals. The aforesaid output signal thus comprises a FM-CPSK signal having four phase deviations corresponding to the sum of each of the phase deviations of the first signal with each of the phase deviations of the second signal (i.e., the sum of the first and third phase deviations, first and fourth phase deviations, second and third phase deviations, and the second and fourth phase deviations). Each of the latter four phase deviations hence represents the encoded form of a different one of the information states carried via the first and second binary signals.

In one specific embodiment of the invention, the first and second binary signals are applied to first and second binary modulators, respectively. The first modulator encodes its applied signal into a FM-CPSK signal having two phase deviations while the second modulator encodes its applied signal into a FM-CPSK signal having the same two phase deviations. The output FM-CPSK from the first modulator is then coupled to a phase deviation converter which converts the signal phase deviations into two other phase deviations. The converted FM-CPSK signal and the FM-CPSK signal from the second modulator are then applied to a mixer circuit which develops a FM-CPSK signal having four phase deviations, as above-indicated.

DESCRIPTION OF THE DRAWINGS

The above and other features and aspects of the present invention will become more apparent upon consideration of the following detailed description taken in conjunction with the following drawings, in which.

DETAILED DESCRIPTION

Figure 1:
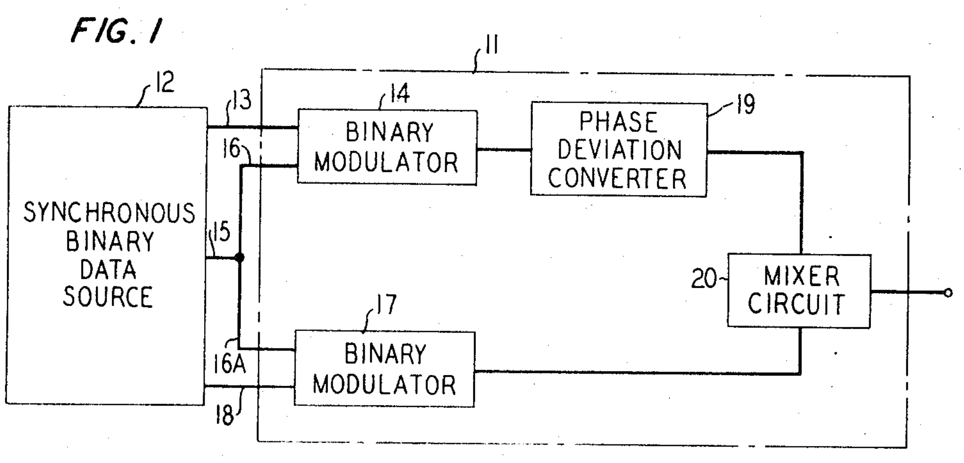
FIG. 1 shows a multi-level modulator, in accordance with the principles of the present invention.

FIG. 1 shows a modulator 11 for encoding digital data into a multi-level frequency modulated coherent phase-shift keyed signal (FM-CPSK). The following discussion of modulator 11 will be carried out by making reference to the signals shown in FIG. 2.

Modulator 11 is fed digital data from a synchronous binary data source 12 which develops two synchronous output binary signals 21 and 22. These signals are both synchronized to a clock signal 23 which is also developed by the source 12. Clock signal 23 has a period T and a frequency $f_s$. Thus, as shown, each of the signals 21 and 22 comprises data bits occurring over corresponding T second time slots. Seven such time slots are illustrated ((0-T), (T-2T), (2T-3T), etc.).

The upper level of the binary signal 21 represents one of its binary states and will be designated herein as a "1" bit. The lower level of the latter signal depicts its other state and will be designated as a "0" bit. Similarly, the upper and lower levels of binary signal 22 represent its two states and will also be designated as "1" and "0" bits, respectively.

Since each of the binary signals 21 and 22 has two states, simultaneous transmission of both signals is equivalent to the transmission of four information states. The latter information states correspond, respectively, to the simultaneous transmission during a time slot of the following combinations of transmitted signal bits: transmission of a "0" bit via signal 21 and "0" bit via signal 22 (the 00 information state), transmission of a "0" bit via signal 21 and a "1" bit via signal 22 (the 01 information state), transmission of a "1" bit via signal 21 and "0" bit via signal 22, (the 10 information state) and transmission of a "1" bit via signal 21 and a "1" bit via signal 22 (the 11 information state). The foregoing four information states are to be encoded by modulator 11 into four phase deviations of a single FM-CPSK signal.

Signal 21 is coupled by wavepath 13 to a first binary modulator 14. Also coupled to modulator 14, via wavepaths 15 and 16, is the clock signal 23. In response to the aforesaid two signals, modulator 14 develops a two-level FM-CPSK signal 24. As shown, signal 24 encodes each "0" bit of signal 21 into a $-\pi/2$ phase deviation over the respective bit time slot, while it encodes each "1" bit of signal 21 into a $+\pi/2$ phase deviation over the respective bit time slot. The latter phase deviations have been determined with respect to a reference signal at the center frequency $f_c$ of signal 24. The frequency $f_c$ is the frequency midway between the frequencies $f_1$ and $f_2$ where, as shown, $f_1$ is the frequency of signal 24 which results in a $+\pi/2$ phase deviation during a time slot and the frequency $f_2$ is the frequency of signal 24 which results in a $-\pi/2$ phase deviation during a time slot (i.e., frequencies $f_1$ and $f_2$ correspond, respectively, to the transmission of a "1" bit and "0" bit of signal 21). In the instant illustrative embodiment, the frequencies $f_1$ and $f_2$ differ by $f_s/2$, with the frequency $f_1$ being equal to $4f_s$ and the frequency $f_2$ being equal to $(7/2)f_s$. The phase of signal 23 at the end of each time slot relative to the phase of the center frequency $f_c$ is also indicated in the figure.

A second binary modulator 17, which is similar to modulator 14, receives the other binary signal 22 via wavepath 18. Clock signal 23 is also coupled to modulator 17 through wavepaths 15 and 16A. In response to these signals, modulator 17 encodes the data in binary signal 22 into the phase deviations of a second two-level FM-CPSK signal 25. It is assumed that signal 25 develops the same frequencies $f_1$ and $f_2$ during the "1" and "0" bit transmissions, respectively, of signal 22. This assumption is made to simplify the discussion, however, and it is not intended to be a limitation on the invention. As shown, therefore, signal 25 develops a $+\pi/2$ phase deviation during transmission of a "1" bit of signal 22 and a $-\pi/2$ phase deviation during the transmission of a "0" bit of the latter signal. The aforesaid phase deviations are with respect to a reference signal at the center frequency $f_c$ of signal 25. The phase of signal 25 at the end of each time slot relative to the phase of the center frequency reference signal is also indicated in the drawing.

Figure 3:
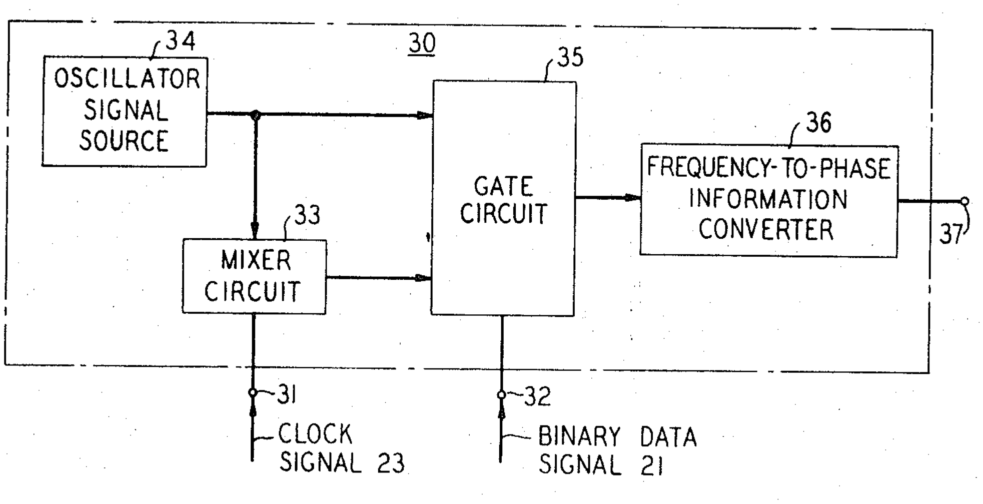
FIG. 3 illustrates one type of binary modulator which can be employed in the modulator of FIG. 1.

One type of binary modulator for developing a two level FM-CPSK signal, such as signal 24 or 25, is shown in FIG. 3. The latter modulator will be discussed in greater detail hereinbelow.

The FM-CPSK signal 24 is coupled from modulator 14 to a phase deviation converter 19. Converter 19 performs a frequency and thus phase division of signal 24 without affecting the coherency and continuity of the signal. In the present illustrative example, converter 19 is assumed to divide the frequency and thus the phase of signal 24 by 2. As a result, the converter generates an output two-level FM-CPSK signal 26 whose frequencies are ½ those of signal 24. The resultant phase deviations of signal 26, relative to the center frequency of the signal $(f_c/2)$, will thus also be ½ those of signal 24. As shown, therefore, signal 26 develops phase deviations of $\pm\pi/4$ where the $+\pi/4$ phase deviation corresponds to the $+\pi/2$ phase deviation of signal 24 (i.e., to the transmission of a "1" bit of signal 21) and the $-\pi/4$ phase deviation corresponds to the $-\pi/2$ phase deviation of signal 24 (i.e., to the transmission of a "0" bit of signal 21). As with the signals 24 and 25, the phase of signal 26 at the end of each time slot relative to the center frequency of the signal $f_c/2$ are also depicted in the figure.

Converter 19, typically, might comprise a divide by two flip-flop circuit followed by a filter circuit. The flip-flop circuit develops an output which changes state for every cycle of the input signal 24. The latter flip-flop output is then filtered by the filter circuit to result in the FM-CPSK signal 26.

Signals 25 and 26 are both coupled from their respective generating sources to a mixing circuit 20. The latter circuit develops an output signal 27 which is at the sum of the frequencies of the two applied signals 25 and 26. The frequency and phase deviation of signal 27 during each of the time slots are thus equal, respectively, to the sum of the frequencies and the sum of the phase deviations of signals 25 and 26 occurring during the slot. Hence, as shown, signal 27 comprises four different sum frequencies $(f_1+f_1/2)$, $(f_1+f_2/2)$, $(f_2+f_2/2)$ and $(f_2+f_1/2)$ which result respectively, in four different phase deviation sums $(+\pi/2+\pi/4=3\pi/4)$, $(+\pi/2-\pi/4=+\pi/4)$, $(-\pi/2-\pi/4=-3\pi/4)$ and $(-\pi/2+\pi/4=-\pi/4)$. The latter phase deviations were determined with respect to a reference signal at the center frequency $3f_c/2$ of signal 27.

As is readily apparent, the $\pm3\pi/4$ phase deviations of signal 27 represent the encoded form of the "11" information state (state of slot (3T-4T), and the "00" information state (state of slot (T-2T), respectively, of signals 21 and 22. The $\pm\pi/4$ phase deviations, on the other hand, correspond to the encoded form of the "01" information state (state of slot (4T-5T) and the "10" information state (state of slot (2T-3T), respectively, of the latter two signals. By mixing the two two-level FM-CPSK signals 25 and 26, therefore, the four information states of signals 21 and 22 carried via these two signals have been encoded into four phase deviations of a single FM-CPSK signal 27.

It should be noted that while it was assumed that converter 19 divided signal 24 by 2, the converter could have divided the signal by any other possible number. Thus, if, e.g., it would have divided signal 24 by 4, the resultant phase deviations of signal 26 would have been $\pm\pi/8$ for a "1" and "0" bit of signal 21. Mixing the latter signal with signal 25 would, in turn, result in a multilevel FM-CPSK signal having four phase deviations of $\pm3\pi/8$ and $\pm5\pi/8$.

One further point to note is that while mixer circuit 20 was indicated as developing a signal at the sum frequency of signals 25 and 26, it could just as well have developed a signal at the difference frequency of the signals. If that were the case, signal 27 would comprise the four frequencies $(f_1-f_1/2)$, $(f_1-f_2/2)$, $(f_2-f_2/2)$ and $(f_2-f_1/2)$ which, in turn, would result in the four phase deviation sums $(\pi/2-\pi/4=\pi/4)$, $(+\pi/2+\pi/4=3\pi/4)$, $(-\pi/2+\pi/4=3\pi/4)$ and $(-\pi/2-\pi/4=-3\pi/4)$. The $\pm\pi/4$ phase deviations thus would correspond to the "11" and the "00" information states, respectively, and the $\pm3\pi/4$ phase deviations to the "01" and "10" information states, respectively.

Retrieval of the original data from signal 27 can be readily realized by coherently detecting the phase of the signal and then comparing the detected phase values at the beginning and end of each time slot to obtain the phase deviation during the slot. More, particularly, coherent detection of the phase of signal 26 can be accomplished by mixing the signal in a mixer circuit with a local oscillator signal which is at any one of the frequencies of signal 27. The phase of the local oscillator is set so that it is either exactly in phase or exactly out-of-phase with the corresponding transmitted frequency. The mixer circuit output can then be applied to a conventional phase detector circuit which samples the phase at the beginning and end of each time slot. If a local oscillator signal at $(f_1 + f_1/2)$ is used, then the detector classifies the sampled phase values as either 0, $\pi$, $+\pi/2$ or $-\pi/2$. If the phase values at the beginning and end of a slot are classified the same, then a 0 phase deviation (i.e., the "11" information state) is detected. If the phase values at the beginning and end of a slot are classified differently, then if they differ by $+\pi/2$, a $+\pi/2$ phase deviation (i.e., the "00" information state) is detected, if they differ by $+\pi$ a $\pi$ phase deviation (i.e., the "10" information state) is detected and if they differ by $-\pi/2$ a $-\pi/2$ phase deviation (i.e., the "01" information state) is detected.

In FIG. 3 one type of modulator for developing a two-level FM-CPSK signal is shown. Modulator 30 can be employed to generate signal 24 by using binary signal 21 as an input signal and, moreover, can also be used to generate signal 25 by using binary input signal 22 as an input. In either case, the operation of the modulator is the same. For discussion purposes, therefore, it will be assumed that signal 24 is to be generated and thus that signal 21 is the input signal to the modulator.

As shown in FIG. 3, modulator 30 comprises first and second signal input ports 31 and 32 which receive input clock signal 23 and binary data signal 21, respectively. Port 12 couples the signal energy fed thereto to a mixer circuit 33 which is additionally fed energy by an oscillator signal source 34. The output of mixer 33 is coupled to a gate circuit 35 as is the output of oscillator 34. The gate circuit is controlled by the signal energy applied to port 32, which port is also coupled to the gate. The output of gate 35 is coupled to a frequency-to-phase information converter 36 whose output is coupled from the modulator via output port 37 and comprises the desired FM-CPSK signal 24.

Figure 2:
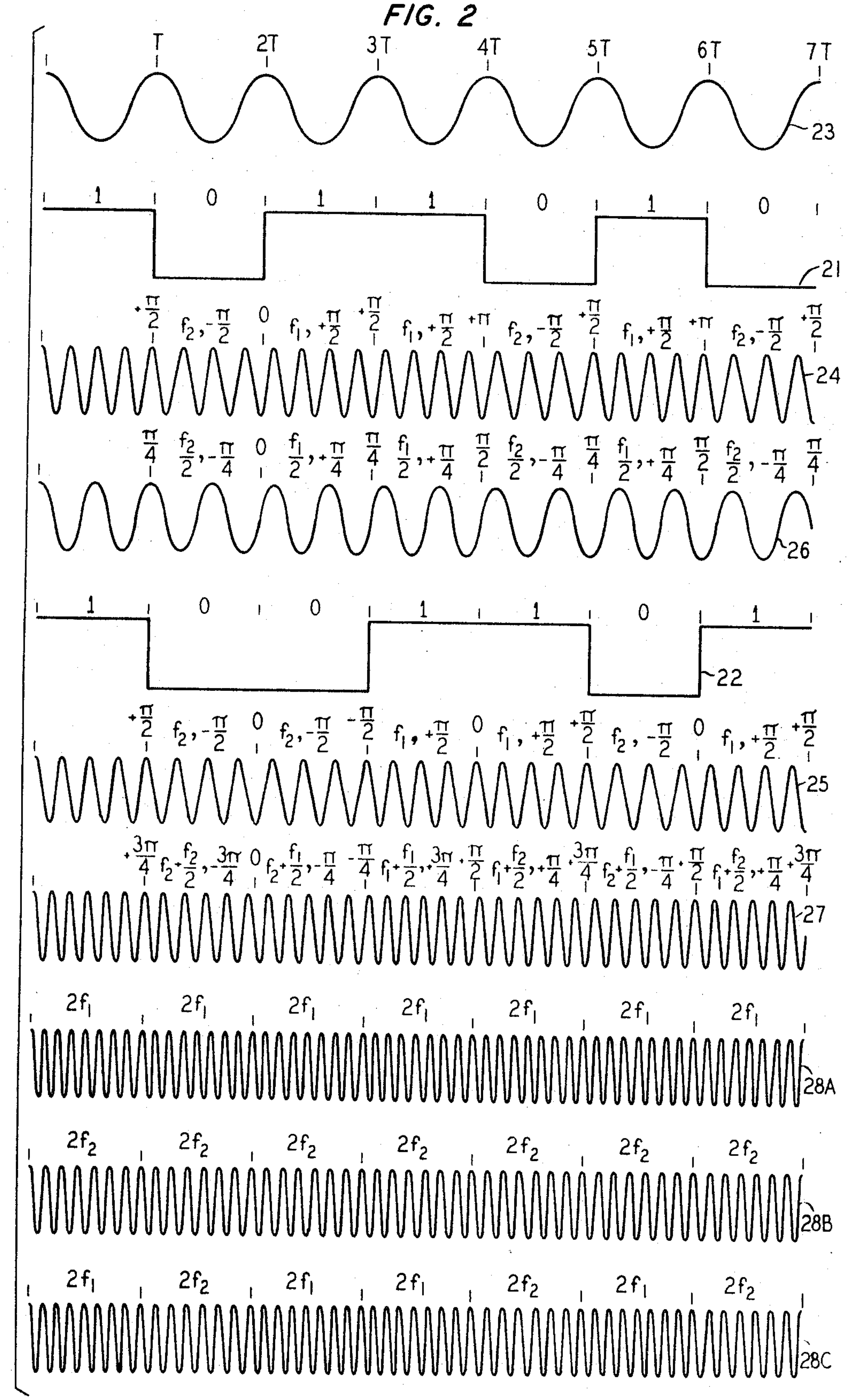
FIG. 2, included for the purposes of explanation, illustrates some of the signals in the arrangements of FIGS. 1 and 3.

The operation of modulator 30 will be discussed by making reference to the signals 21, 23, 24, 28A, 28B and 28C shown in FIG. 2.

In operation, coherent clock signal 23 is applied, via input port 31, to mixer 33 of modulator 30. Also applied to mixer 33 is a second coherent cosinusoidal signal 28A which is developed by oscillator 34 of the modulator.

In the instant case oscillator signal 28A is synchronized with clock signal 23 (circuitry for realizing such synchronization is well known in the art and, thus, has been omitted from the drawing) and, in addition, the frequency $2f_1$ of the oscillator signal is an integer multiple K of the clock frequency $f_s$. For the particular illustrative signals of FIG. 2, the integer K is equal to 8, and thus the oscillator frequency is equal to $8f_s$.

Mixer circuit 33 mixes the signals 23 and 28A and develops an output signal 28B which is at the difference frequency $2f_2$ of the mixed signals, where $2f_2 = 2f_1 - f_s = 7f_s$. It is important to note, that since signals 28A and 28B differ by the clock frequency $f_s$, that at the end of each successive T second time interval or slot (i.e., time slots (0-T), (T-2T), (2T-3T), etc.), the signals are at the same phase. In the particular illustrative case, since the difference signal 28B goes through 7 complete cycles during each time slot and the signal 28A goes through 8 complete cycles, both signals are at zero phase at the end of each slot. The aforesaid phase conditions of signals 28A and 28B are readily apparent from FIG. 2, which shows both signals at their maximum positive amplitudes at the end of each of the depicted T second time slots.

Signals 28A and 28B are coupled from their respective sources to gate circuit 35 whose operation is controlled by binary data signal 21 which is coupled to the gate via input signal port 32.

Binary signal 21 keys or controls the gating operation of gate 35 with respect to the transmission of signals 28A and 28B. In particular, when signal 21 is at its upper amplitude level (i.e., during transmission of each "1" bit), the gate circuit permits transmission of signal 28A, while it inhibits transmission of signal 28B. Conversely, when signal 21 is at its lower amplitude level (i.e., during transmission of each "0" bit) the gate inhibits signal 28A, while it transmits signal 28B.

The aforesaid gating action thus causes each "1" bit to be encoded into the coherent frequency $2f_1$ (frequency of signal 28A) and each "0" bit to be encoded into the difference frequency $2f_2$ (frequency of signal 28B), as is indicated by gate output signal 28C. Moreover, since each of the signals 28A and 28B is at the same phase at the end of each time slot, the phase of gate output 28C remains continuous at all transitions from one data bit to the next. As a result, signal 28C is both coherent (since it is composed of the coherent frequencies $2f_1$ and $2f_2$) and continuous and thus can be characterized as a frequency modulated coherent frequency-shift keyed (FM-CFSK) signal.

Gate output signal 28C is coupled to a frequency-to-phase information converter 36 wherein the encoded frequencies of the signal are themselves encoded into relative signal phase-shifts over their respective time slots. More particularly, converter 36 performs a frequency division and thus a phase division of signal 28C. Such frequency division, while not affecting the coherency or phase continuity properties already established, results in a signal whose relative phase change during each of the T second time slots corresponds to the frequency of signal 28C occurring during that time slot.

In the present case converter 35 divides the frequency and phase of signal 28C by 2, resulting in output two-level FM-CPSK having a frequency $f_1$ and a phase deviation of $+\pi/2$ during time slots in which signal 21 is a "1" bit and a frequency $f_2$ and phase deviation of $-\pi/2$ during time slots in which signal 21 is a "0" bit. As already indicated, the resultant output signal from modulator 30 is thus the desired signal 24.

Figure 4:
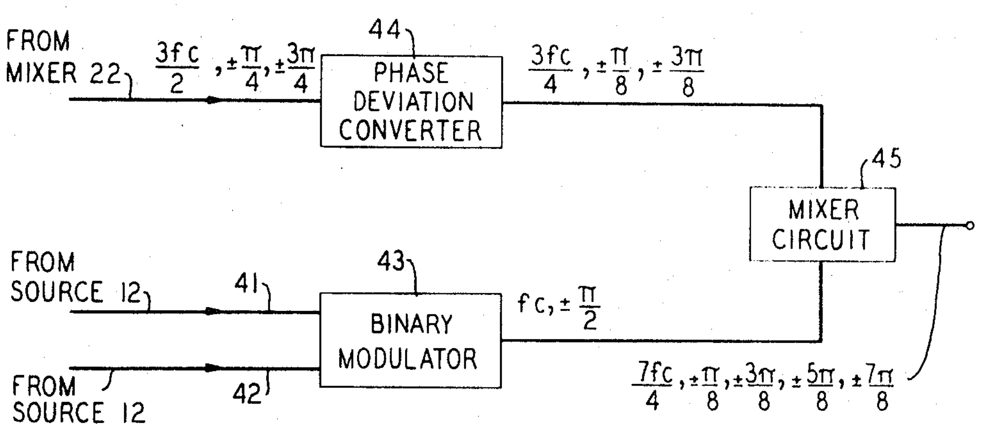
FIG. 4 shows, a modified version of the modulator of FIG. 1.

It should be pointed out that the principles of the present invention are intended to extend to situations in which any number of information states are to be encoded into an equivalent number of phase deviations of a single FM-CPSK signal. Thus, e.g., the encoding of 8 information states corresponding to the simultaneous transmission of three binary signals into a FM-CPSK signal having 8 phase deviations, can be readily accomplished by modifying the embodiment of FIG. 1 as shown in FIG. 4 (only the additional elements added to the structure of FIG. 1 are shown in FIG. 4). As illustrated, signal paths 41 and 42 couple clock signal 23 and the additional binary signal from source 12 to a third binary modulator 43. The latter modulator is of the same type as modulators 14 and 17 and, thus, in response to these signals, it encodes the binary data into a two-level FM-CPSK signal having a center frequency $f_c$ and phase deviations of $\pm\pi/2$, as indicated. The four level FM-CPSK signal 27 from mixer 20 is fed to a second phase deviation converter 44 which operates in a similar manner as converter 19. Thus converter 44 divides the frequency and phase of the four-level signal by 2 resulting in an output four-level FM-CPSK signal having a center frequency $3f_c/4$ and phase deviations of $\pm\pi/8$ and $\pm3\pi/8$, as indicated.

The converter output and the output from modulator 43 are then coupled to a second mixer circuit 45 which produces a sum frequency output signal in an analagous manner as mixer circuit 20. The resultant sum frequency signal from circuit 45 is a FM-CPSK signal having a center frequency of $7f_c/4$ and 8 phase deviations $\pm\pi/8$, $\pm3\pi/8$, $\pm5\pi/8$ and $\pm7\pi/8$, each of which corresponds to one of the 8 information states to be transmitted.

In all cases, it is understood that the above-described arrangements are merely illustrative of some of the possible specific embodiments which represent applications of the present invention. Numerous and varied other arrangements can be readily devised in accordance with these principles without departing from the spirit and scope of the invention.

What is claimed is:

1. A modulator for encoding the information states carried via two binary signals, which are synchronized to a clock signal, into the phase deviations of a multilevel frequency modulated coherent phase-shift keyed signal comprising:

means responsive to one of said binary signals for generating a first frequency modulated coherent phase-shift keyed signal having two phase deviations corresponding to the binary states of said one signal;

means responsive to the other of said binary signals for generating a second frequency modulated coherent phase-shift keyed signal having two other different phase deviations corresponding to the binary states of said other signal;

and means for mixing said first and second signals thereby producing an output signal comprising a frequency modulated coherent phase-shift keyed signal having four phase deviations.

2. A modulator in accordance with claim 1 in which said output signal is at the sum frequency of said first and second signals and said four phase deviations correspond, respectively, to the sum of each of said two phase deviations of said first signal with each of said two other different phase deviations of said second signal.

3. A modulator in accordance with claim 1 in which said output signal is at the difference frequency of said first and second signals and said four phase deviations correspond, respectively, to the difference of each of said two phase deviations of said first signal from each of said two other different phase deviations of said second signal.

4. A modulator in accordance with claim 1 in which said first signal has phase deviations of $\pm\pi/4$ relative to a reference signal at its center frequency and said second signal has phase deviations of $\pm\pi/2$ relative to a reference signal at its center frequency.

5. A modulator in accordance with claim 1 in which said means for generating said first phase-shift keyed signal comprises:

a first binary modulator responsive to said one signal for developing a frequency modulated coherent phase-shift keyed signal having first and second phase deviations corresponding to the binary states of said one signal;

and phase deviation converter means for receiving the phase shift-keyed signal from said first modulator and converting it into a frequency modulated coherent phase-shift keyed signal having third and fourth phase deviations:

and said means for generating said second phase-shift keyed signal comprises:

a second binary modulator responsive to said other signal for developing a frequency modulated coherent phase-shift keyed signal having two phase deviations corresponding to the binary states of said other signal which are the same as said first and second phase deviations.

6. A modulator in accordance with claim 5 in which said phase-shift keyed signals developed by said first and second modulators have the same center frequency.

7. A modulator in accordance with claim 6 in which said first phase deviation is $\pm\pi/2$ and said second phase deviation is $-\pi/2$ relative to a reference signal at said center frequency.

8. A modulator in accordance with claim 5 in which said phase deviation converter comprises a frequency divider circuit for performing a frequency and phase division of the phase-shift keyed signal developed by said first modulator.

9. A modulator for encoding the information states carried via a plurality of binary signals, which are synchronized to a clock signal, into the phase deviations of a multi-level frequency modulated coherent phase-shift keyed signal comprising:

a plurality of successive signal paths each responsive to one of said binary signals, said plurality of paths including a first path, intermediate paths, and a last path;

said first path comprising:

a binary modulator for developing a first frequency modulated coherent phase-shift keyed signal having a center frequency $f_c$ and first and second phase deviations relative to said center frequency;

and divider means for dividing the phase and frequency said first signal to produce a divided frequency output signal;

said intermediate paths each comprising:

a binary modulator for developing an intermediate, frequency modulated coherent phase-shift keyed signal having the same center frequency and phase deviations as said first signal;

means for mixing said intermediate signal with the divided frequency output signal of the next preceding signal path to produce a mixed output signal;

and divider means for dividing the phase and frequency of said mixed output signal to produce a divided frequency output signal;

and said last of said plurality of paths comprising:

a binary modulator for developing a last frequency modulated coherent phase-shift keyed signal having the same center frequency and phase deviations as said first and intermediate signals;

and means for mixing said last signal with the divided frequency output signal of the next to last signal path to produce said multi-level frequency modulated coherent phase-shift keyed signal.

10. A binary modulator in accordance with claim 9 in which said first and second phase deviations are $\pm\pi/2$, respectively, and each of said divider means divides the frequency and phase of signals applied thereto by 2.

11. A modulator for encoding the information states carried via two or more information signals into the phase deviations of one frequency modulated coherent phase-shift keyed signal comprising:

a first modulator means responsive to one or more of said information signals for developing a first frequency modulated coherent phase-shift keyed signal having phase deviations corresponding to the information states carried via said one or more information signals;

a second modulator means responsive to the other remaining ones of said information signals for developing a second frequency modulated coherent phase-shift keyed signal having phase deviations corresponding to the information states carried via said remaining ones of said information signals;

and means for mixing said first and second signals to produce said one frequency modulated coherent phase-shift keyed signal.

12. A modulator in accordance with claim 11 in which said one frequency modulated coherent phase-shift keyed signal is at the sum frequency of said first and second signals.

13. A modulator in accordance with claim 11 in which said second frequency modulated coherent phase-shift keyed signal has two phase deviations.

14. A method of encoding the information states carried via two binary signals, which are synchronized to a clock signal, into the phase deviations of a multi-level frequency modulated coherent phase-shift keyed signal comprising the steps of:

generating a first frequency modulated coherent phase-shift keyed signal having two phase deviations corresponding to the binary states of said one signal;

generating a second frequency modulated coherent phase-shift keyed signal having two other different phase deviations corresponding to the binary states of said other signal;

and mixing said first and second signals to produce a frequency modulated coherent phase-shift keyed signal having four phase deviations.

* * * * *

Disclaimer 3,750,051.—*Douglas MacPherson Brady*, Middletown, N.J. MULTI-LEVEL MODULATOR FOR COHERENT PHASE-SHIFT KEYED SIGNAL GENERATION. Patent dated July 31, 1973. Disclaimer filed Feb. 28, 1974, by the assignee, *Bell Telephone Laboratories, Incorporated.*

Hereby enters this disclaimer to claims 1–14 of said patent.

[*Official Gazette October 15, 1974.*]